(12) United States Patent
Han et al.

(10) Patent No.: US 8,122,357 B2
(45) Date of Patent: Feb. 21, 2012

(54) METHOD AND APPARATUS FOR INTERFACING BETWEEN DEVICES IN HOME NETWORK

(75) Inventors: Sang-jun Han, Seoul (KR); Dae-hyun Kim, Suwon-si (KR); Bo-mi Kim, Yongin-si (KR); Bo-hyun Kyung, Yongin-si (KR); Myoung-soon Choi, Yongin-si (KR); Kuk-hyun Han, Yongin-si (KR); Pil-Seung Yang, Suwon-si (KR); Hark-joon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 770 days.

(21) Appl. No.: 12/259,830

(22) Filed: Oct. 28, 2008

(65) Prior Publication Data

US 2009/0132923 A1    May 21, 2009

Related U.S. Application Data

(60) Provisional application No. 60/989,243, filed on Nov. 20, 2007.

(30) Foreign Application Priority Data

Mar. 28, 2008 (KR) .................. 10-2008-0029326

(51) Int. Cl.
*G06F 3/00* (2006.01)
(52) U.S. Cl. .................. 715/717; 715/863; 345/158
(58) Field of Classification Search ................. 715/717, 715/863; 345/158
See application file for complete search history.

(56) References Cited

U.S. PATENT DOCUMENTS

| | | | |
|---|---|---|---|
| 2003/0020763 A1* | 1/2003 | Mayer et al. | 345/838 |
| 2007/0136778 A1* | 6/2007 | Birger et al. | 725/117 |
| 2009/0322676 A1* | 12/2009 | Kerr et al. | 345/158 |

* cited by examiner

*Primary Examiner* — Boris Pesin
*Assistant Examiner* — Andres E Gutierrez
(74) *Attorney, Agent, or Firm* — Sughrue Mion, PLLC (57) ABSTRACT

A method of interfacing between devices in a home network control device includes dividing a screen into at least two areas, assigning a predetermined contents service function to each of the divided screen areas, sensing the position of the screen that an external device approaches and the distance between the screen and the external device reproducing content, and performing the contents service function differently between devices for each screen area according to the position of the screen that the external device approaches and the distance between the screen and the external device.

19 Claims, 12 Drawing Sheets

METHOD AND APPARATUS FOR INTERFACING BETWEEN DEVICES IN HOME NETWORK

CROSS-REFERENCE TO RELATED PATENT APPLICATIONS

This application is a non-provisional application of the Provisional U.S. Patent Application No. 60/989,243, filed Nov. 20, 2007, in the United States Patent and Trademark Office, and claims priority from Korean Patent Application No. 10-2008-0029326, filed Mar. 28, 2008, in the Korean Intellectual Property Office, the disclosures of which application are incorporated herein in their entireties by reference.

BACKGROUND OF THE INVENTION

1. Field of the Invention

Methods and apparatuses consistent with the present invention relate to a home network control system, and more particularly, to a method of interfacing between devices for sharing and reproducing information in a home network control system.

2. Description of the Related Art

With the establishment of an environment for receiving various multimedia services based on a home network, users are able to use a huge amount of contents such as home contents, broadcast service data provided by external contents providers, material through web applications, contents related to games and entertainments, and personal home page contents. Thus, a user interface method that enables users to easily and tangibly handle the ever-increasing contents is desired.

Figure 1:
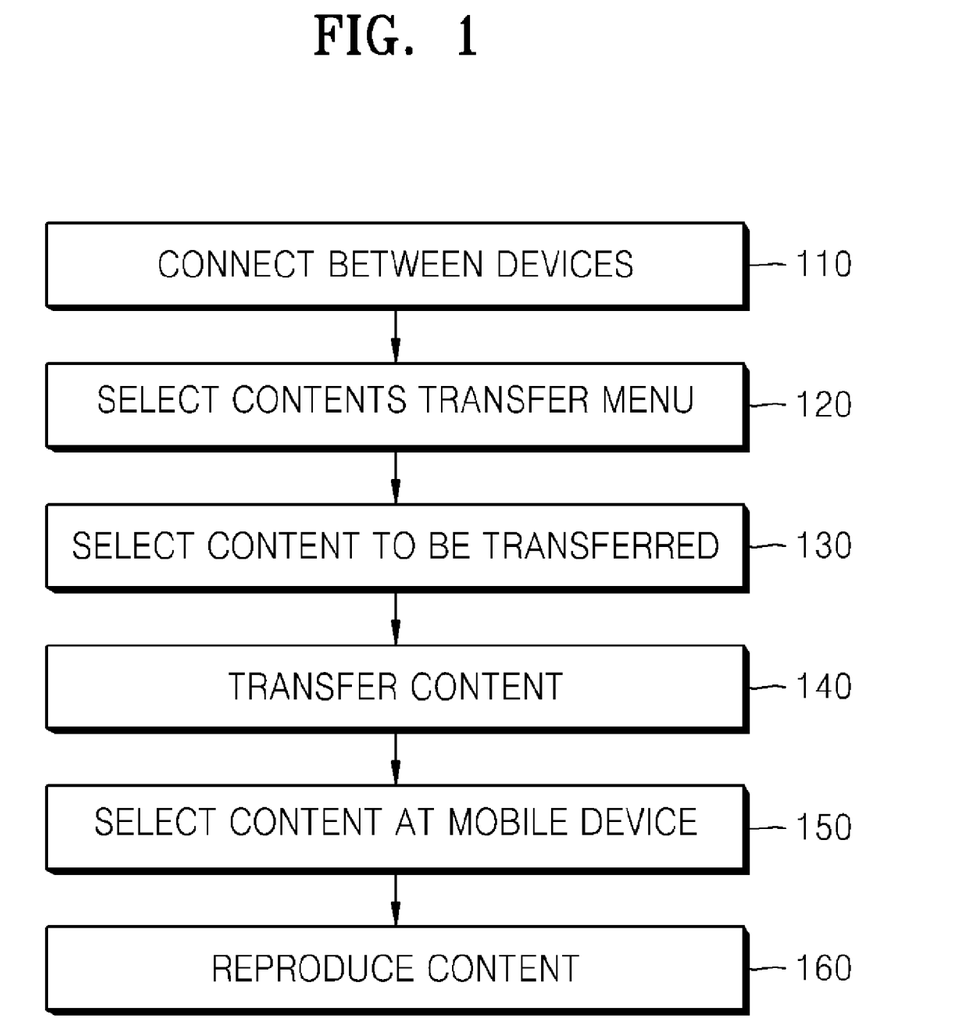
FIG. 1 is a flowchart illustrating a typical interface method between a home device and a mobile device.

Typically, a home device and a mobile device exchange contents through wired/wireless communication. FIG. 1 is a flowchart for explaining a typical interface method between a home device and a mobile device. First, a network connection between a home device and a mobile device is performed through wired/wireless communication 110. A contents transfer menu is selected in the home device 120. Content to be transferred to the mobile device is selected from the contents transfer menu of the home device 130. The selected content is transferred from the home device to the mobile device 140. The content transferred from the home device is selected at the mobile device 150. The selected content is reproduced at the mobile device 160.

However, in the device interface method operated as shown in FIG. 1, the steps of selecting content at the home device using the contents transfer menu and reproducing the selected content at the mobile device are complicated. It may be inconvenient for a user to reproduce the contents of the home device using the mobile device.

SUMMARY OF THE INVENTION

The present invention provides a method of interfacing between devices in a home network controller, which can provide a user with an intuitive and natural interaction between devices by adopting a tangible interaction method of switching devices for reproducing contents.

The present invention provides a home network controller adopting the above-described device interface method.

According to an aspect of the present invention, a method of interfacing between devices in a home network control device includes dividing a screen into at least two areas, assigning a predetermined contents service function to each of the divided screen areas, sensing a position of the screen that an external device approaches and a distance between the screen and the external device reproducing a content, and performing the contents service function between devices differently for each screen area according to the position of the screen that the external device approaches and the distance between the screen and the external device.

According to another aspect of the present invention, a method of interfacing between devices in a home network control device includes sensing a position of a screen that an external device approaches and a distance between the screen and the external device reproducing content, displaying list information of devices capable of reproducing contents connected to the home network control device when a distance between the mobile device and the screen is within a first predetermined distance, displaying that a reproduction device at a closest position to the mobile device is selected from the displayed list information of the devices capable of reproducing contents, and continuously reproducing content by sharing the content between the mobile device and a device connected to the home network control device when the distance between the mobile device and the screen is greater than a second predetermined distance.

According to another aspect of the present invention, a method of interfacing between devices in a home network control device includes sensing a position of a screen that a mobile device approaches and a distance between the screen and the mobile device, displaying a mark area of the mobile device at a position in a particular area of the screen that the mobile device approaches, and receiving contents of the mobile device in the mark area, when the distance between the screen and the mobile device is within a first predetermined distance, and transferring the contents of the mobile device to a device connected to the home network control device by dragging and dropping the contents in the mark area of the mobile device onto the position in the particular area of the screen.

According to another aspect of the present invention, a home network control device includes a screen unit displaying information, a sensor unit installed at a particular position of the screen unit and sensing a position of the screen unit that an external mobile device approaches and a distance between the screen unit and the external mobile device that externally approaches, a control unit sharing contents between the mobile device and a home network connection device by dividing a screen area of the screen unit, assigning a predetermined contents service function to each of the divided screen areas, measuring the position of the screen unit that the external mobile device approaches and the distance between the mobile device and the screen unit by using the sensor unit, and determining a contents service function for each screen area according to the position of the screen unit that the external mobile device approaches and the distance between the mobile device and the screen, and a network transceiving unit performing wireless communication with the mobile device.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

Figure 2:
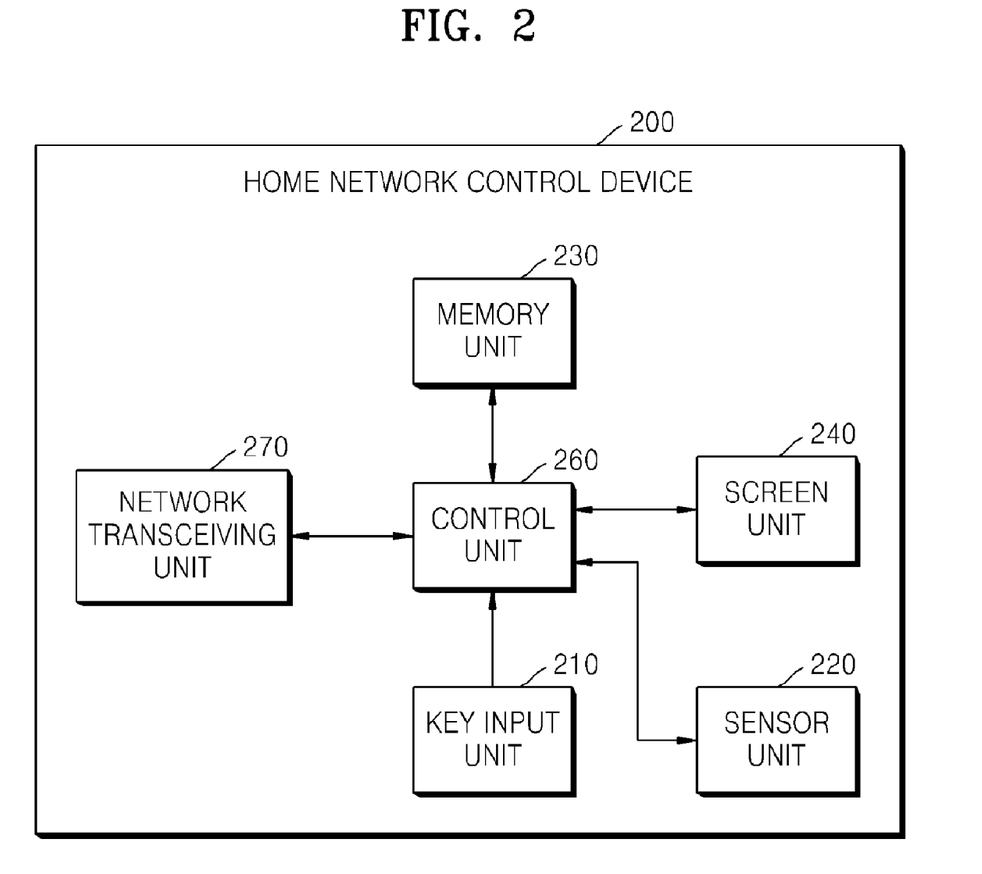
FIG. 2 is a block diagram of a home network controller according to an exemplary embodiment of the present invention.

FIG. 2 is a block diagram of a home network controller or control device 200 according to an exemplary embodiment of the present invention. Referring to FIG. 2, the home network control device 200 includes a key input unit 210, a sensor unit 220, a screen unit 240, a memory unit 230, a control unit 260, and a network transceiving unit 270. The key input unit 210 includes a plurality of numeric keys and character keys and at least one function key. The key input unit 210 generates key data whenever a user presses a predetermined key and provides the generated key data to the control unit 260.

The screen unit 240 displays the key data generated by the key input unit 210 and various information and signals extracted and generated by a control process of the control unit 260. In particular, the screen unit 240 is divided into at least two areas. A predetermined contents service function is assigned to each area.

The sensor unit 220 is installed at a particular position of the screen unit 240 to sense the distance between the screen unit 240 and an external mobile device and the position of the screen unit 240 that the external mobile device approaches. The memory unit 230 includes a predetermined program code to control the overall operation of the control device 200 and stores information input or output by the operation of the program code.

The control unit 260 controls and manages a variety of functions to control home devices, for example, the selection and control of a home device, key input, the output of a reproduced image of the home device, and the output of a sound of the home device. Also, the control unit 260 includes a management program which controls booting, an operating system (OS) and a predetermined agent or application programs. In particular, the control unit 260 divides the screen area of the screen unit 240 into at least two areas and assigns a predetermined contents service function to each of the divided screen areas. Also, the control unit 260 measures the position of the screen unit 240 that the mobile device approaches and the distance between the screen unit 240 and the mobile device which reproduces contents by using the sensor unit 220 and performs a different contents service for each screen area according to the position of the screen unit 240 that the mobile device approaches and the distance between the mobile device and the screen unit 240.

The network transceiving unit 270 converts a code generated by the control unit 260 to a radio frequency (RF) to perform predetermined wired/wireless communications in a wired/wireless network, and performs the wired/wireless communications with home devices connected in the wired/wireless network. The network transceiving unit 270 transceives contents by wireless communication between the home devices connected to the wired/wireless network and the mobile device that externally approaches the screen unit 240.

Figure 3:
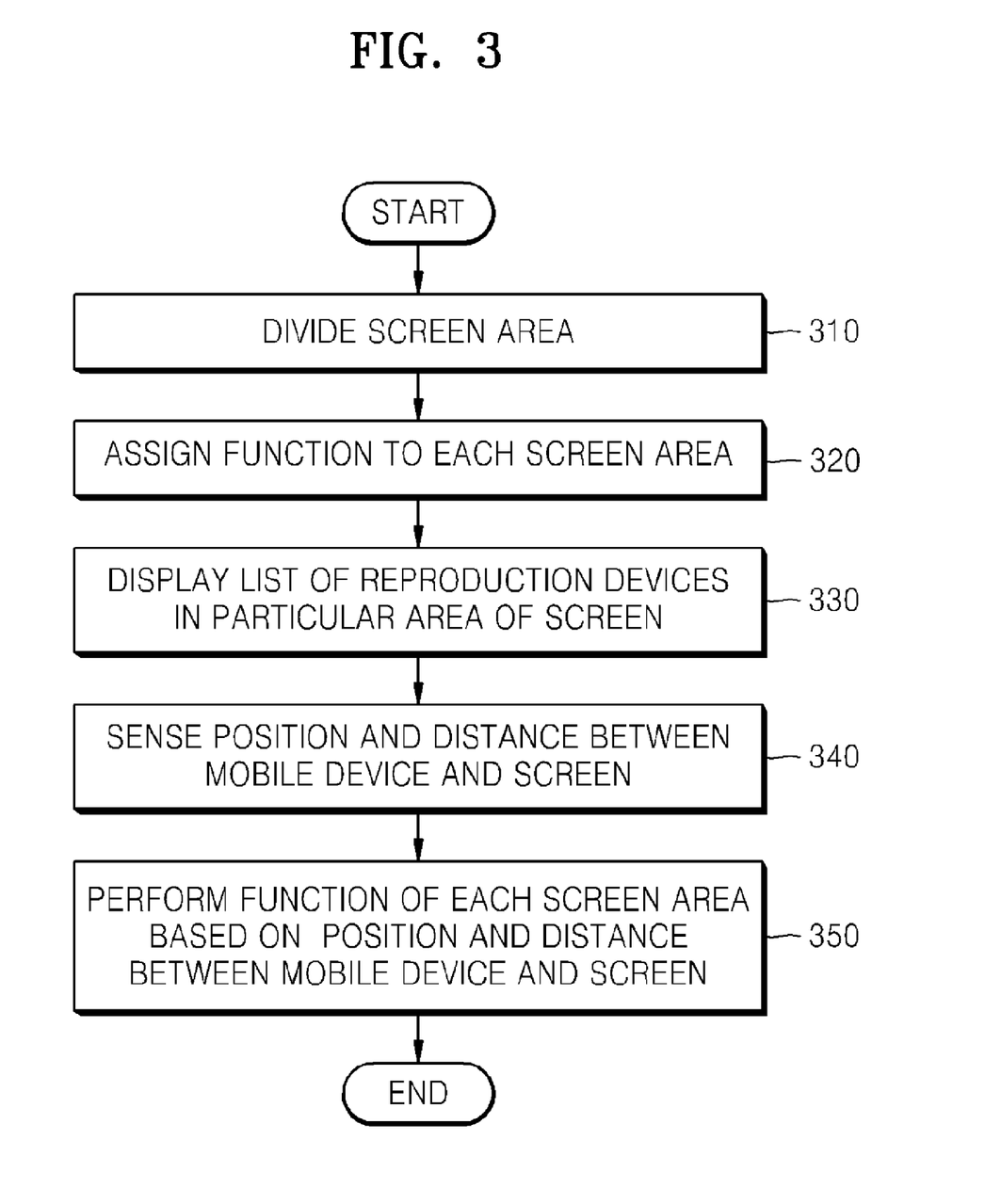
FIG. 3 is a flowchart of a method of interfacing between devices in a home network according to an exemplary embodiment of the present invention.
Figure 6:
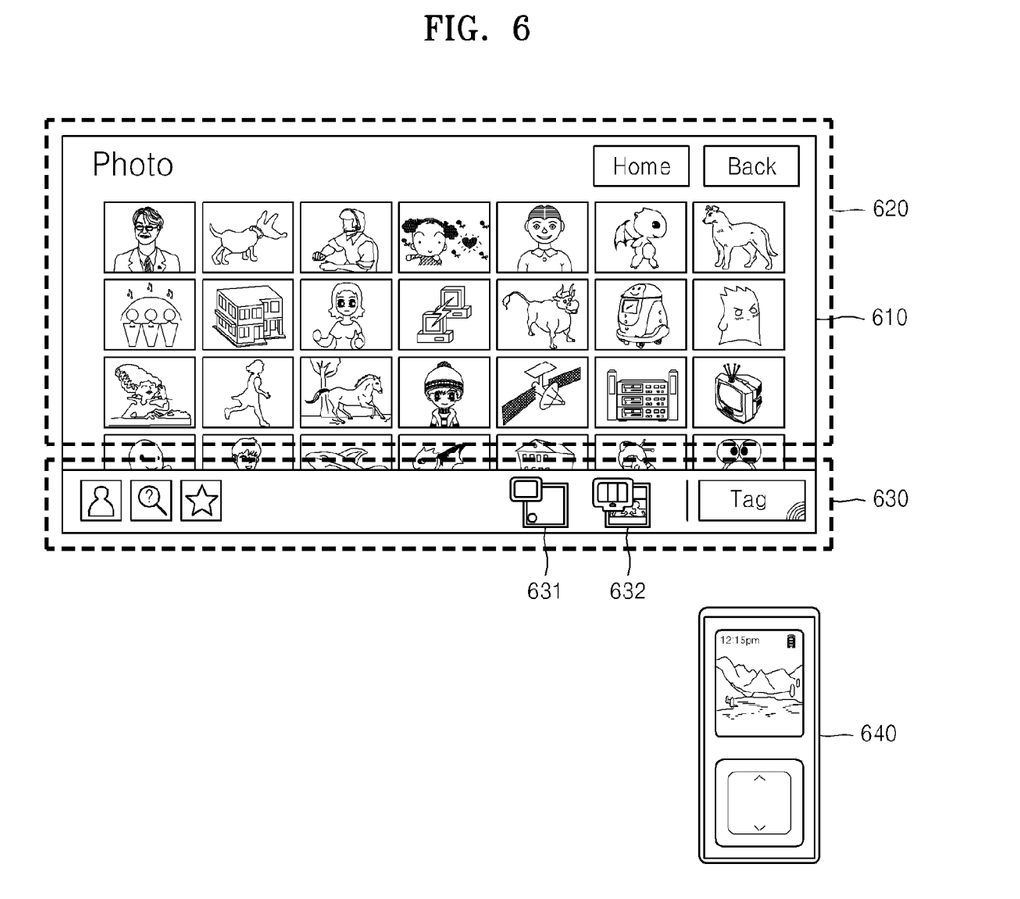
FIG. 6 illustrates an operation of assigning a function to each area of a screen.

FIG. 3 is a flowchart of a method of interfacing between devices in a home network according to an exemplary embodiment of the present invention. The home network control device 200 controls a plurality of home devices, for example, a TV and a DVD player, connected in the wired/wireless network. The home network control device 200 displays a list of the home devices connected through a network on a screen 610 as shown in FIG. 6.

Specifically, the home network control unit 260 divides the screen area into at least two areas (Operation 310). For example, as shown in FIG. 6, the home network control unit 260 divides the screen 610 into a first area 620 and a second area 630.

The home network control unit 260 assigns a predetermined contents service function to each of the divided screen areas 620, 630 (Operation 320). For example, as shown in FIG. 6, the first area 620 is assigned to a contents transfer service function area and the second area 630 is assigned to a seamless service function area. The home network control unit 260 implements in the first area 620 a contents transfer function between the home device and a mobile device 640 and a contents search function in the mobile device 640. Also, the home network control unit 260 implements a seamless contents service function between the home device and the mobile device 640 in the second area 630. The mobile device collectively refers to wired/wireless external terminals capable of reproducing contents.

The home network control unit 260 displays a list of reproduction devices in a particular area of the screen 610 (Operation 330). For example, as shown in FIG. 6, lists 631 and 632 of contents of the home devices, that are being presently reproduced, are displayed in a lower portion of the screen 610. The home network control device senses the position of the screen 610 that the mobile device 640 approaches and the distance between the mobile device 640 and the screen 610 by using an infrared sensor or an ultrasonic sensor (Operation 340). The contents service function for each of the screen areas is performed based on the position of the screen 610 that the mobile device 640 approaches and the distance between the mobile device 640 and the screen 610 (Operation 350).

When the distance between the screen area and the mobile device 640 at the position of the screen area that the mobile device 640 approaches is within a first predetermined distance, appropriate contents service functions are performed. Also, when the mobile device 640 is moved away from the screen 610, a selected contents service function is performed. Particularly, when the distance between the screen area and the mobile device 640 at the position of the screen area that the mobile device 640 approaches is greater than a second predetermined distance, a selected contents service function is performed.

Different content service functions are performed based on the position of the screen area that the mobile device 640 approaches. Different contents service functions are performed based on the state of the reproduction of contents of the mobile device 640 at the position of the screen area that the mobile device 640 approaches.

Figure 4:
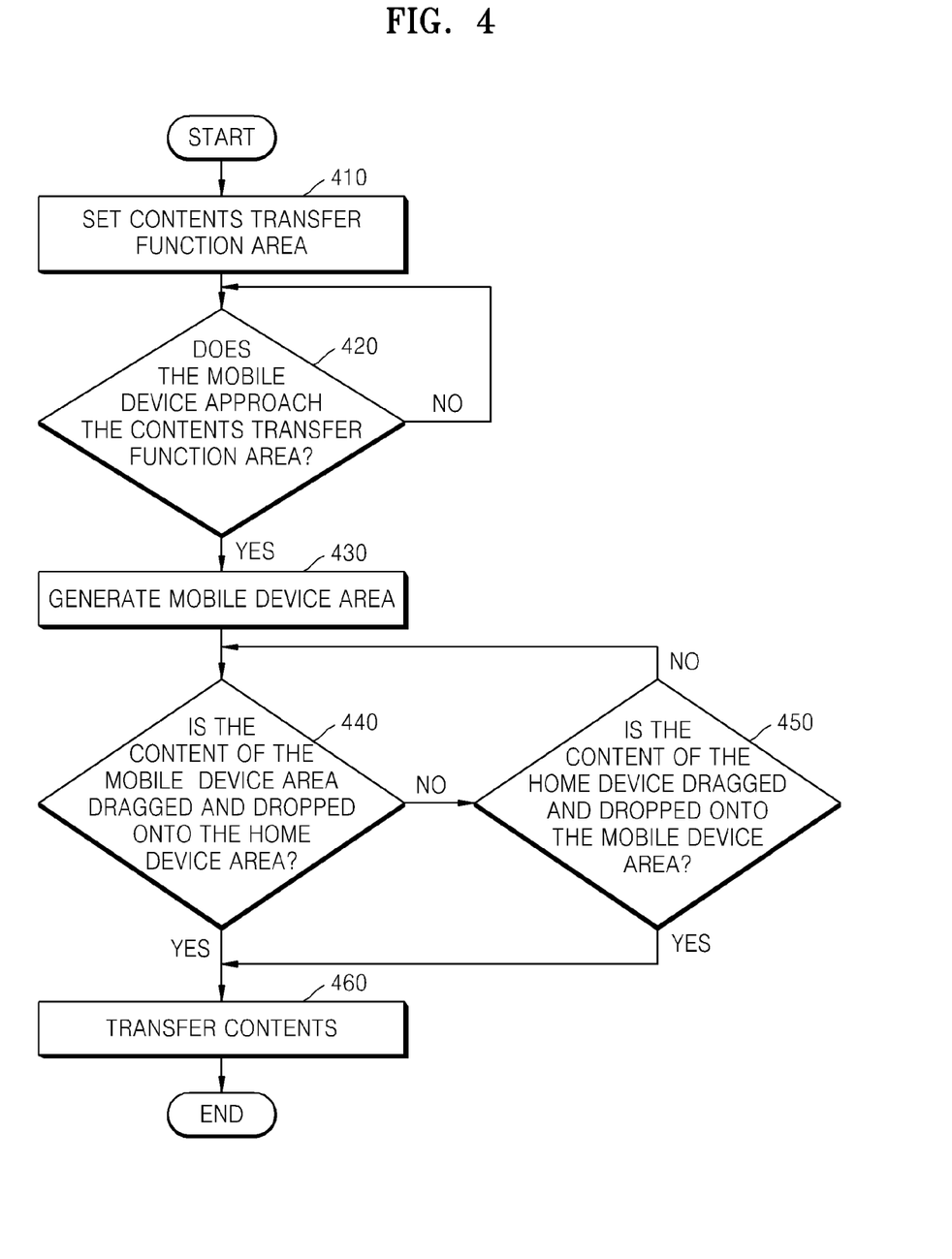
FIG. 4 is a flowchart of a method of interfacing between devices embodying a contents transfer function according to an exemplary embodiment of the present invention.

FIG. 4 is a flowchart of a method of interfacing between devices embodying the contents transfer function according to an exemplary embodiment of the present invention. A part of the screen area of the home network control device 200 is set as a contents transfer service function area (Operation 410). It is checked whether the mobile device 640 approaches the contents transfer service function area of the screen 610 (Operation 420).

Figure 7A:
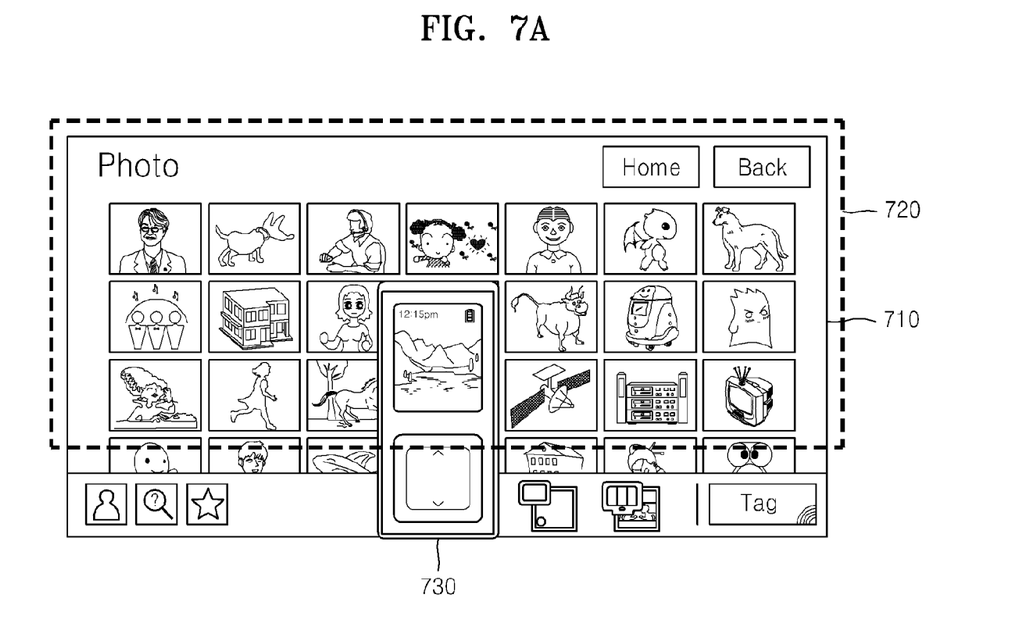
FIG. 7A illustrates an operation of embodying the content transfer function.

Referring to FIG. 7A, the home network control device measures the position of a screen 710 that a mobile device 730 approaches and the distance between the screen 710 and the mobile device 730 by using a distance and position sensor installed on the screen. When the distance between the mobile device 730 and the screen 710 is within a predetermined distance and the position that the mobile device 730 approaches corresponds to coordinates of a contents transfer function area 720 of the screen 710, the home network control unit 260 determines that the mobile device 730 approaches the contents transfer function area 720 of the screen 710.

Figure 7B:
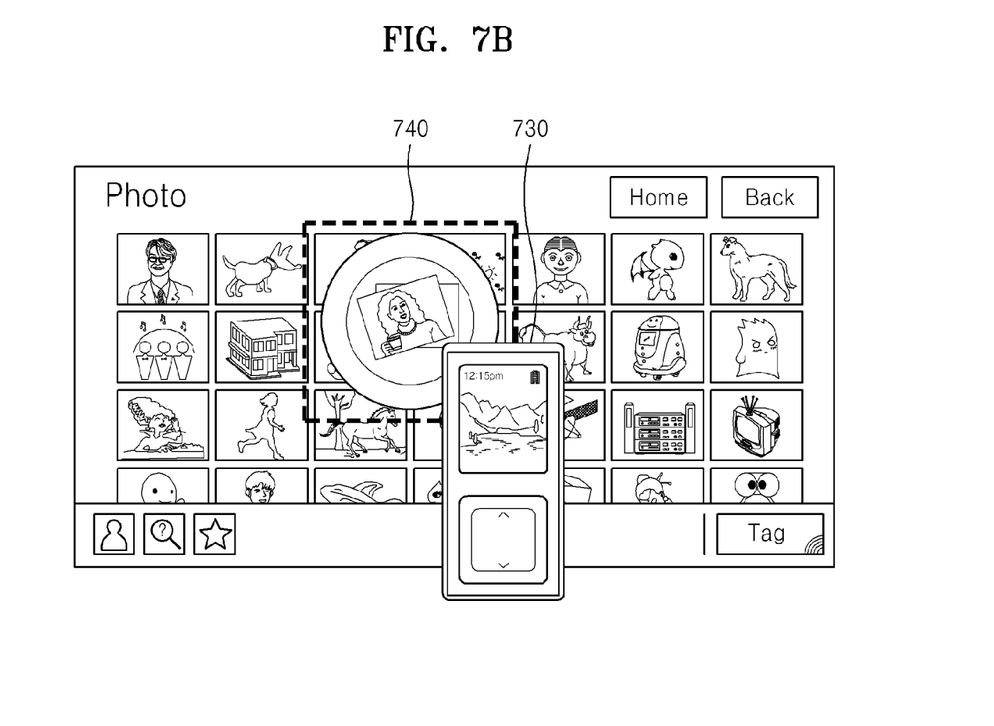
FIG. 7B illustrates enlarging an area of the screen in the content transfer function.

Referring to FIG. 7B, the home network control unit 260 generates a mark area 740 in the contents transfer service function area 720 (Operation 430). A graphic or icons indicating a contents list of the mobile devices received from the mobile device 730 in a wireless communication are displayed in the mark area 740.

It is checked whether a particular item of content in the mark area 740 is dragged and dropped onto a home device area (Operation 440). A drag detection technology may be embodied using motion coordinate information of a touch pointer that is a well-known technology. When the content item of the mark area 740 is dragged to the home device area, the contents of the mobile device are transferred to a particular storage area of the home device (Operation 460).

Figure 7C:
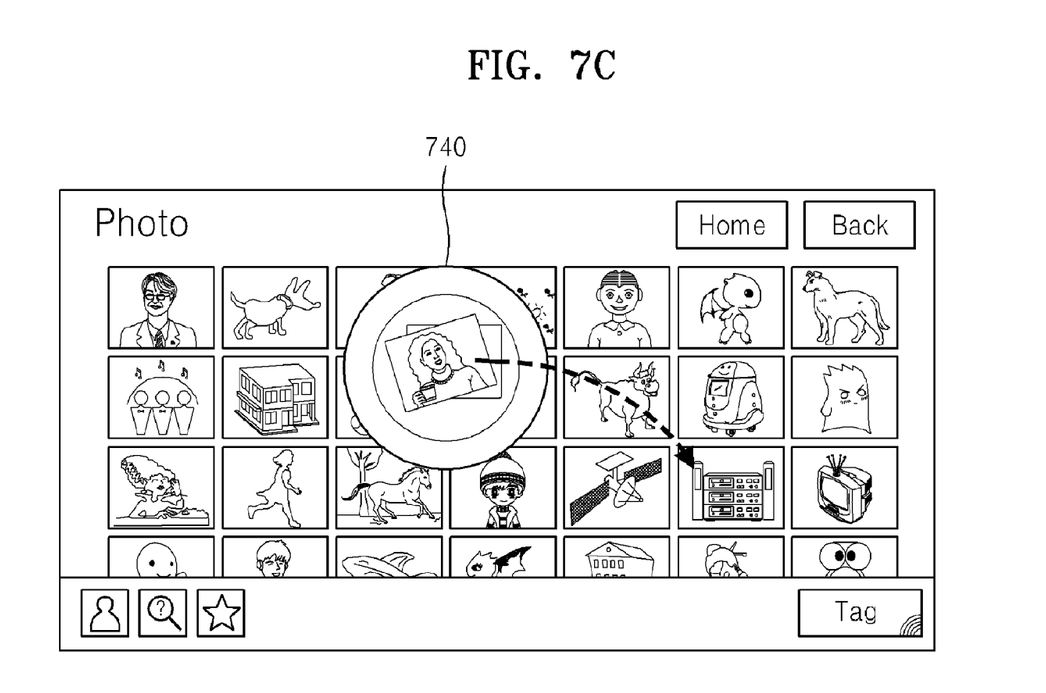
FIG. 7C illustrates transferring content in the content transfer function.

Referring to FIG. 7C, the home network control device moves a particular item of content in the mark area 740 to the home device area of a drag/drop position indicated by a dotted arrow by wireless communication.

If the content item of the mark area 740 is not dragged to the area of the home device, it is checked whether a content item of the home device is dragged and dropped into the mark area 740 (Operation 450).

If the particular item of content in the home device area is dragged and dropped onto the mark area 740, the content of the home device is transferred to the mobile device by wireless communication (Operation 460).

Figure 5A:
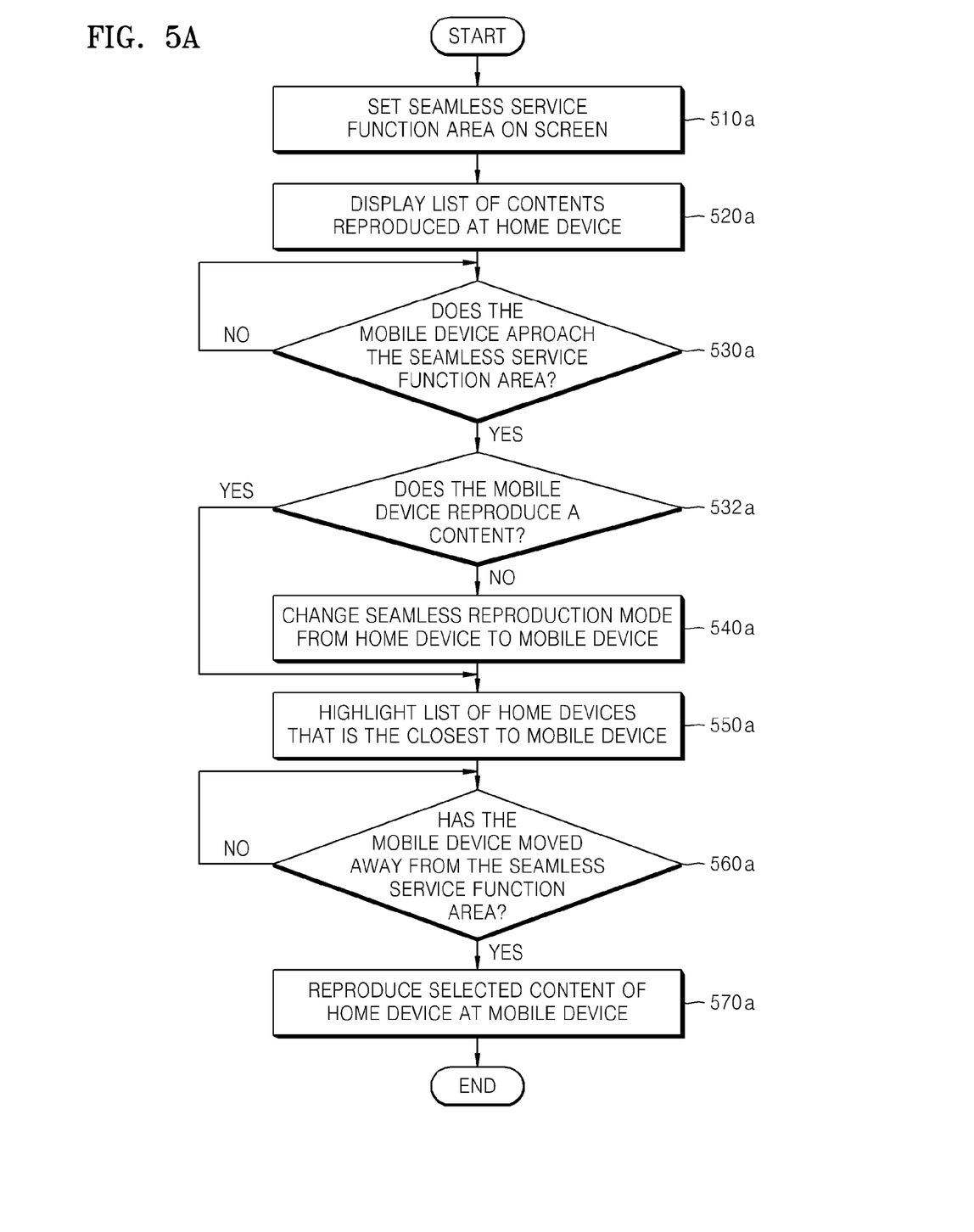
FIG. 5A is a flowchart of a method of interfacing between devices embodying a seamless service function according to an exemplary embodiment of the present invention.

FIG. 5A is a flowchart of a method of interfacing between devices embodying a seamless service function according to an exemplary embodiment of the present invention. The interface method of FIG. 5A embodies a seamless service function to have the content that is reproduced by the home device to be continuously reproduced by the mobile device.

A part of the screen area is set as a seamless service function area (Operation 510*a*). A list of home devices that are presently reproducing the content is displayed in the seamless service function area (Operation 520*a*). For example, referring to FIG. 8A, a seamless service function area 820 is set on a screen 810 and lists 831 and 832 of the home devices, for example, a TV or a DVD, that are presently reproducing the contents are displayed in a contents list area 830 of the seamless service function area 820.

Figure 8A:
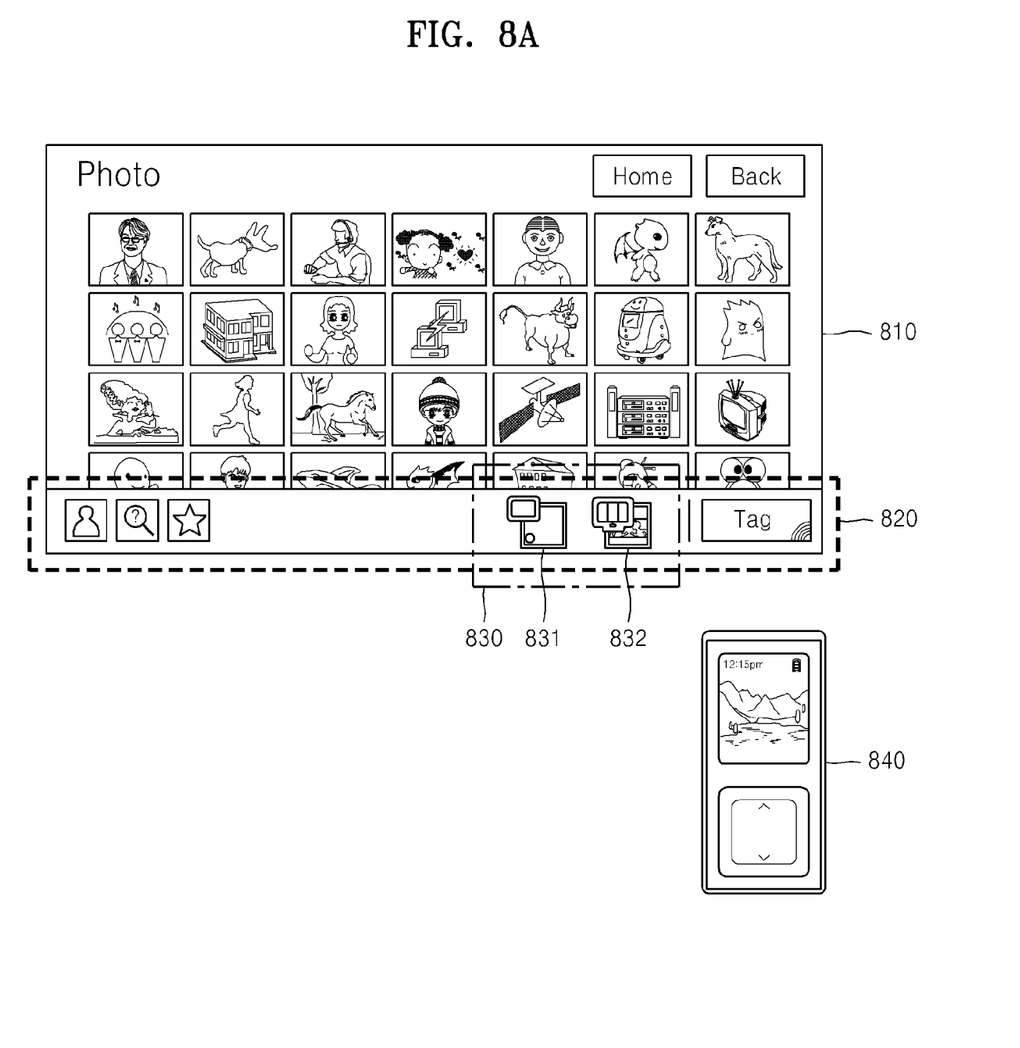
FIG. 8A illustrates an operation of embodying the seamless service function.
Figure 8B:
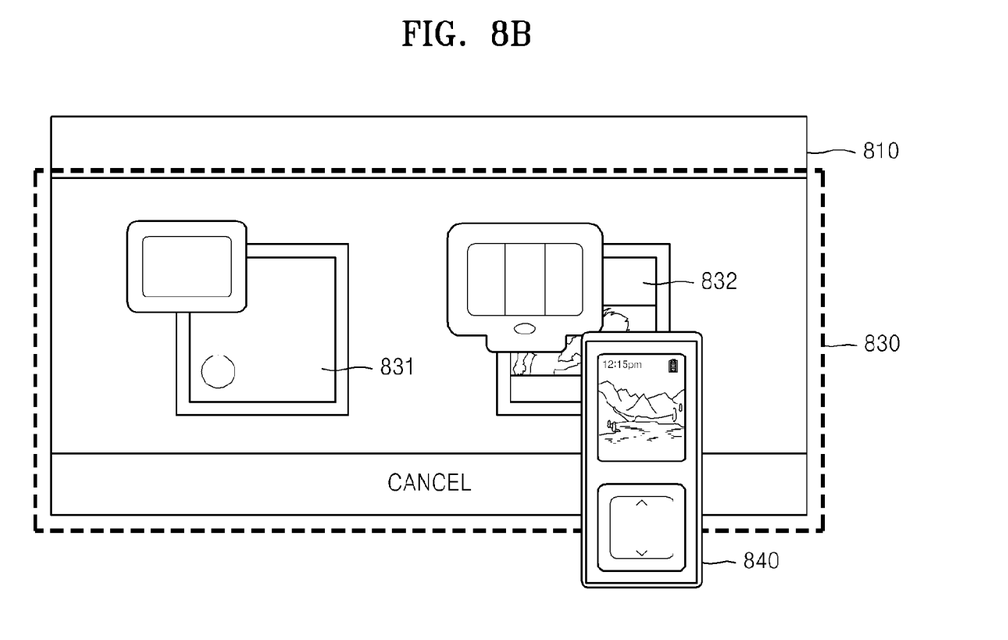
FIG. 8B illustrates enlarging an area of the screen in the seamless service function.

It is checked whether a mobile device 840 approaches the seamless service function area 820 (Operation 530*a*). Referring to FIGS. 8A and 8B, the home network control unit 260 measures the position of the screen 810 that the mobile device 840 approaches and the distance between the screen 810 and the mobile device 840 by using a distance and position sensor installed at the screen 810. When the distance between the mobile device 840 and the screen 810 is within a first predetermined distance and the position of the screen 810 that the mobile device 840 approaches corresponds to the coordinates of the seamless service function area 820, the home network control unit 260 senses that the mobile device 840 approaches the seamless service function area 820 of the screen 810.

It is checked whether the mobile device 840 reproduces the contents by wireless communication (Operation 532*a*). When the mobile device 840 is not reproducing the contents, a seamless reproduction mode is set to perform a contents continuous reproduction function from the home device to the mobile device 840 (Operation 540*a*). The seamless service function area 820 is enlarged so that selection of the contents of the home device may be performed easily. Referring to FIG. 8B, the home network control unit 260 enlarges the contents list area 830 so that the content reproduced at the home device may be easily selected using the mobile device 840.

Figure 8C:
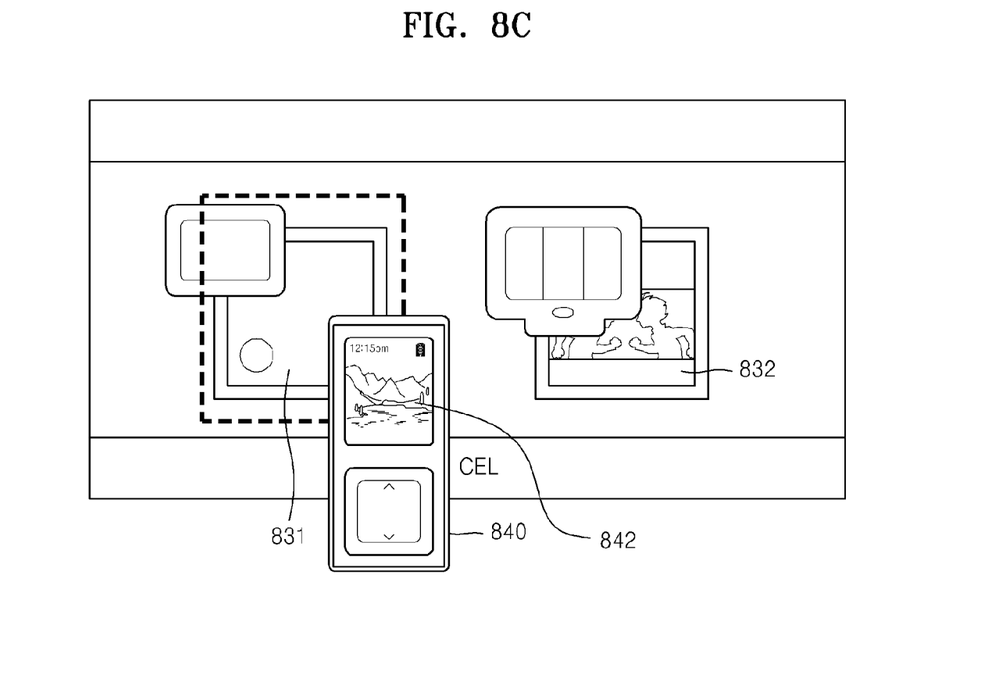
FIG. 8C illustrates highlighting an area of the screen in the seamless service function.

The list of home devices that is the closest to the mobile device 840 from among the contents lists of the home devices displayed in the seamless service function area 820 is highlighted based on the position of the screen 810 that the mobile device 840 approaches and the distance between the screen 810 and mobile device 840 (Operation 550*a*).

Referring to FIG. 8C, the home network control unit 260 highlights a content item 831 that is the closest to the mobile device 840. The content of the home device that is presently selected by wireless communication is displayed on a screen 842 of the mobile device 840. It is checked whether the mobile device 840 is moved away from the seamless service function area 820 (Operation 560*a*).

Figure 8D:
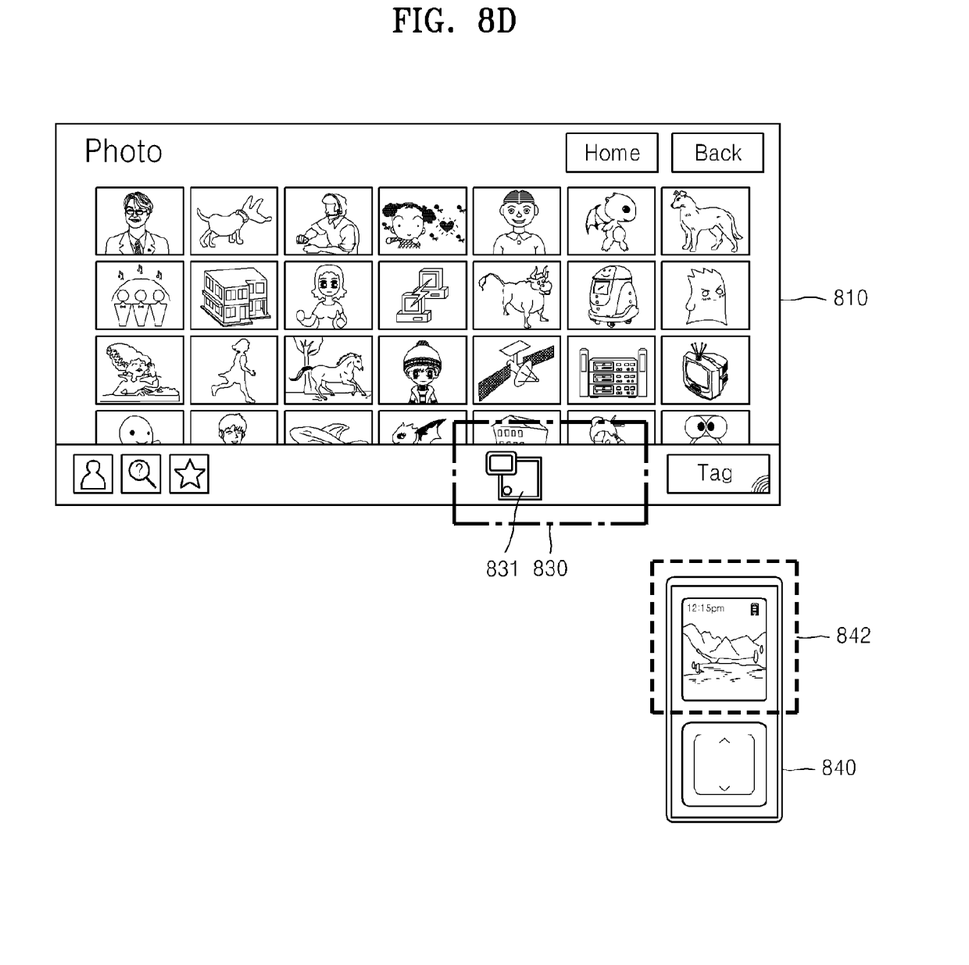
FIG. 8D illustrates transferring the content in the seamless service function.

Referring to FIG. 8D, the home network control unit 260 measures the position of the screen 810 that the mobile device 840 approaches and the distance between the screen 810 and the mobile device 840 by using the position and distance sensor installed on the screen 810. When the distance between the mobile device 840 and the screen 810 is greater than a second predetermined distance, the home network control unit 260 senses that the mobile device 840 is moved away from the seamless service function area 820 (Operation 560*a*).

If the mobile device 840 is moved away from the seamless service function area 820, the contents reproduction device is changed from the home device to the mobile device 840. The content of the home device that is selected is continuously reproduced by the mobile device 840 (Operation 570*a*).

Referring to FIG. 8D, when the home network control unit 260 senses that the mobile device 840 has moved away from the seamless service function area 820, the control unit 260 turns off the home device that presently reproduces the content. The mobile device 840 receives the content that is reproduced by the home device and continuously reproduces the received content. The screen 842 of the mobile device 840 displays the content of the home device that is being reproduced.

Figure 5B:
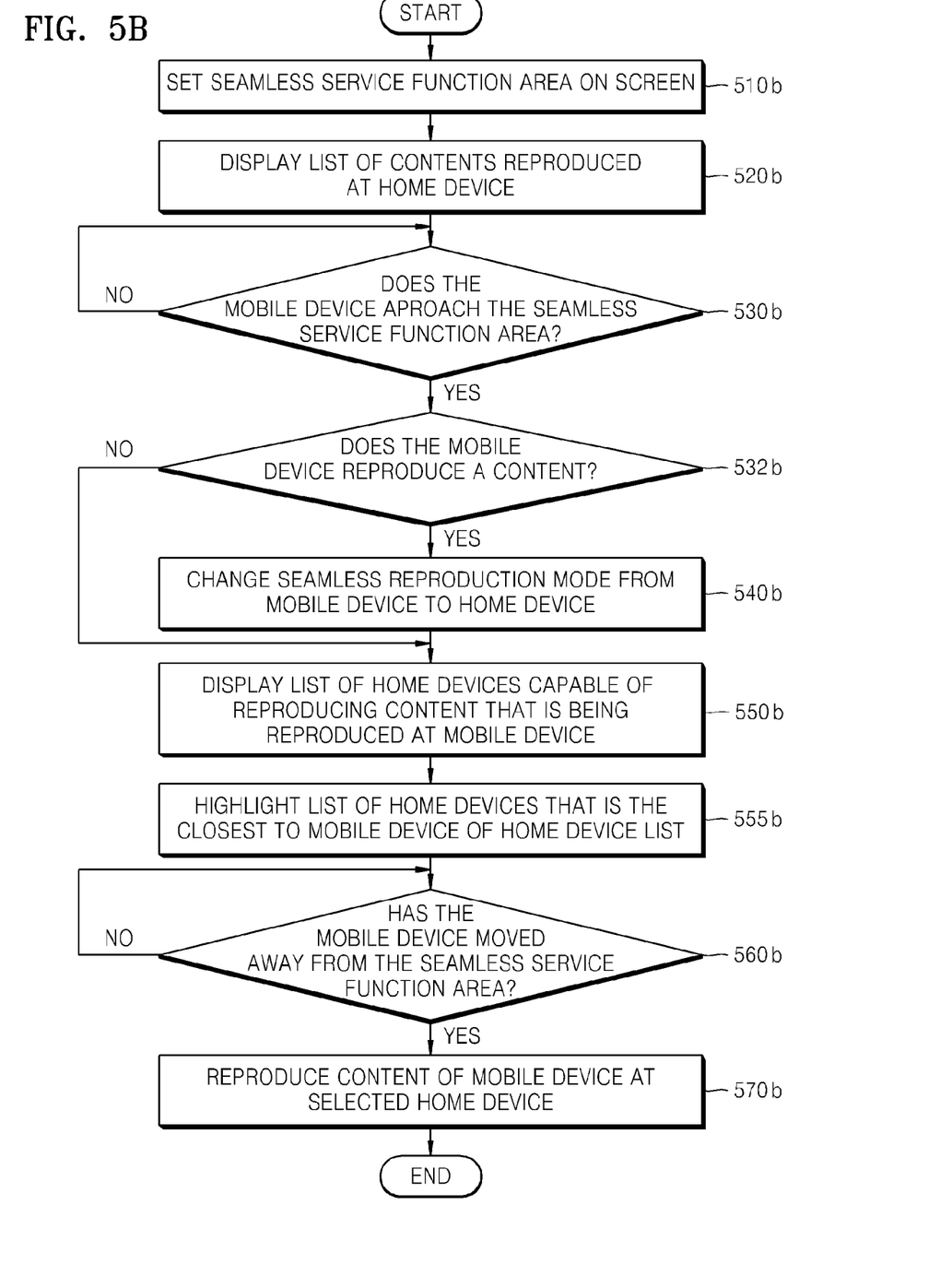
FIG. 5B is a flowchart of a method for interfacing between devices embodying a seamless service function according to another exemplary embodiment of the present invention.

FIG. 5B is a flowchart showing a method of interfacing between devices coupled to a home network controller embodying a seamless service function according to another exemplary embodiment of the present invention. The interface method of FIG. 5B embodies a seamless service function for the content that is being reproduced by the mobile device to be continuously reproduced by the home device.

A part of the screen area is set as the seamless service function area 820 (Operation 510*b*). A list of home devices that presently reproduce content is displayed in the seamless service function area 820 (Operation 520*b*). It is checked whether the mobile device 840 approaches the seamless service function area 820 (Operation 530*b*). When the mobile device 840 is sensed approaching the seamless service function area 820, it is checked whether the mobile device reproduces content by wireless communication (Operation 532*b*).

If the mobile device reproduces content, a seamless reproduction mode is set to perform a contents continuous reproduction function from the mobile device 840 to the home device (Operation 540*b*). Also, the seamless service function area 820 is enlarged to make the selection of the content of the home device easy.

Lists of the home devices capable of reproducing the contents that are reproduced by the mobile device 840 are displayed (Operation 550*b*). A list of the home devices that is the closest to the mobile device 840 from among the contents lists of the home devices displayed in the seamless service function area 820 is highlighted based on the position of the screen 810 that the mobile device 840 approaches and the distance between the screen 810 and the mobile device 840 (Operation 555*b*).

It is checked whether the mobile device 840 has moved away from the seamless service function area 820 (Operation 560*b*). If it is sensed that the mobile device 840 has moved away from the seamless service function area 820, the contents reproduction device is changed from the mobile device 840 to the home device so that the content of the mobile device that is presently reproduced is continuously reproduced by the home device (Operation 570*b*). That is, when the home network control unit 260 senses that the mobile device 840 has moved away from the seamless service function area 820, the content received from the mobile device 840 by wireless communication is continuously reproduced at the home device that is selected. Also, the home network control unit 260 displays the contents of the mobile device 840 that are being presently reproduced in the seamless service function area 820.

The invention may also be embodied as computer readable codes on a computer readable recording medium. The computer readable recording medium is any data storage device that may store data which may be thereafter read by a computer system. Examples of the computer readable recording medium include read-only memory (ROM), random-access memory (RAM), CD-ROMs, magnetic tapes, floppy disks, and optical data storage devices. The computer readable recording medium may also be distributed over network coupled computer systems so that the computer readable code is stored and executed in a distributed fashion.

According to exemplary embodiments of the above-described invention, as a tangible interaction method is introduced in a process of embodying an interface between a mobile device and a home device. An intuitive and natural interaction between the devices may be provided to a user.

While the invention has been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A method of interfacing between devices coupled to a home network control device, the method comprising:
   dividing a screen of the home network control device into at least two areas;
   assigning a predetermined contents service function to each of the divided screen areas;
   sensing a position of the screen that an external device approaches and a distance between the screen and the external device, wherein the external device reproduces a content; and
   performing the contents service function between devices differently for each divided screen area according to the sensed position of the screen that the external device approaches and the sensed distance between the screen and the external device.

2. The method of claim 1, wherein the sensing comprises:
   sensing a position of the screen area that the external device approaches; and
   sensing a distance from the sensed screen area to the external device.

3. The method of claim 1, wherein the performing the contents service function comprises:
   determining that the distance between the screen area and the external device at the position of the screen that the external device approaches is within a first predetermined distance; and
   performing a first contents service function.

4. The method of claim 3, wherein the performing the contents service function comprises:
   determining that the distance between the screen area and the external device at the position of the screen that the external device approached is greater than a second predetermined distance; and
   performing a second contents service function.

5. The method of claim 2, wherein the performing the contents service function comprises:
   performing different contents service functions according to the position of the screen area that the external device approaches.

6. The method of claim 2, wherein the performing the contents service function comprises:
   performing different contents service functions according to a contents reproduction state of the external device at the position of the screen area that the external device approaches.

7. The method of claim 2, wherein performing the contents service function comprises:
   enlarging an image presented in the screen area when the distance between the screen area and the external device is within a predetermined distance.

8. A method of interfacing between devices connected to a home network control device, the method comprising:
   sensing a position of a screen of the home network control device that an external device approaches and a distance between the screen and the external device, wherein the external device reproduces content;
   displaying list information of the devices, which reproduce contents and are connected to the home network control device when a distance between the external device and the screen is within a first predetermined distance;

identifying a reproduction device at a closest position to the external device, which reproduction device is selected from the displayed list information; and continuously reproducing content by sharing the content between the external device and the identified reproduction device when the distance between the external device and the screen becomes greater than a second predetermined distance.

9. The method of claim 8, wherein the displaying the list information comprises:

enlarging an image presented in a screen area when the distance between the external device and the screen is within the first predetermined distance.

10. The method of claim 8, wherein the identifying the reproduction device comprises:

highlighting the information of the identified reproduction device, from among the information of the devices displayed on the screen.

11. The method of claim 8, wherein the identifying the reproduction device comprises:

displaying contents of the identified reproduction device on a screen of the external device.

12. The method of claim 8, further comprising:

checking whether the external device is reproducing content when the distance between the external device and the screen is within the first predetermined distance;

when the mobile device is not reproducing the content, setting a seamless reproduction mode to continuously reproduce the content from the identified reproduction device to the external device; and when the external device is reproducing the content, setting a seamless reproduction mode to continuously reproduce the content from the external device to the identified reproduction device.

13. The method of claim 8, wherein the continuously reproducing the content comprises:

continuously reproducing the content of the identified reproduction device at the external device.

14. The method of claim 8, wherein the continuously reproducing the content comprises:

continuously reproducing the content of the external device by the identified reproduction device.

15. A method of interfacing between devices coupled to a home network control device, the method comprising:

sensing a position of a screen of the home network control device that a mobile device approaches and a distance between the screen and the mobile device;

displaying a mark area of the mobile device at a position in a first area of the screen that the mobile device approaches, receiving contents of the mobile device in the mark area when the distance between the screen and the mobile device is within a predetermined distance; and transferring the contents of the mobile device to a device connected to the home network control device by dragging and dropping the contents from the mark area onto a position in a second area of the screen.

16. The method of claim 15, further comprising:

transferring contents of the device connected to the home network control device by dragging and dropping the contents of the device onto the mark area.

17. A home network control device comprising:

a screen unit which displays information;

a sensor unit, installed at a particular position of the screen unit, which sensor unit senses a position of the screen unit that an external mobile device approaches, a distance between the screen unit and the approaching external mobile device and provides a measurement result;

a control unit which shares contents between the mobile device and a home device coupled to the home network control device by:

dividing a screen area of the screen unit into screen areas, assigning a predetermined contents service function to each of the divided screen areas, measuring the position of the screen unit that the external mobile device approaches and the distance between the mobile device and the screen unit based on the measurement result, and determining a contents service function for each divided screen area according to the position of the screen unit that the external mobile device approaches and the distance between the mobile device and the screen; and a network transceiving unit which performs wireless communication with the mobile device.

18. The method of claim 17, wherein the network transceiving unit performs wireless communication between the mobile device and the control unit.

19. A non-transitory computer readable recording medium having a program recorded thereon, which program, when executed by a computer, causes the computer to execute a method of interfacing between devices coupled to a home network control device, the method comprising:

dividing a screen area of the home network control device into at least two areas;

assigning a predetermined contents service function to each of the divided screen areas;

sensing a position of the screen that an external device approaches and a distance between the screen and the external device, wherein the external drive reproduces content; and performing contents service function between devices differently for each divided screen area according to the position of the screen that the external device approaches and the distance between the screen and the external device.

\* \* \* \* \*